US012091634B2

(12) United States Patent
Delcotto

(10) Patent No.: US 12,091,634 B2
(45) Date of Patent: Sep. 17, 2024

(54) CANDLE HAVING A WOODEN WICK WITH FIGURED GRAIN

(71) Applicant: Melynda S. Delcotto, North Huntingdon, PA (US)

(72) Inventor: Melynda S. Delcotto, North Huntingdon, PA (US)

(73) Assignee: Melynda Delcotto, North Huntingdon, PA (US)

( * ) Notice: Subject to any disclaimer, the term of this patent is extended or adjusted under 35 U.S.C. 154(b) by 0 days.

(21) Appl. No.: 17/840,756

(22) Filed: Jun. 15, 2022

(65) Prior Publication Data

US 2022/0306965 A1 Sep. 29, 2022

Related U.S. Application Data

(63) Continuation of application No. 15/728,599, filed on Oct. 10, 2017, now Pat. No. 11,384,313, which is a continuation of application No. 15/074,301, filed on Mar. 18, 2016, now Pat. No. 9,816,053.

(60) Provisional application No. 62/138,521, filed on Mar. 26, 2015.

(51) Int. Cl.
*C11C 5/00* (2006.01)

(52) U.S. Cl.
CPC .................................... *C11C 5/006* (2013.01)

(58) Field of Classification Search
CPC ... C11C 5/006; C11C 1/00; C11C 3/00; C11C 5/00; C11C 5/02; B27D 1/00; B27M 1/08; B27M 3/00; F23D 3/08; F23D 3/16; F23D 3/40; F23D 3/02; G01N 27/407; G01N 27/4073; G01N 27/4075; G01N 27/4076
USPC ........... 431/288, 325, 289, 291; D26/116, 6; 144/329, 346, 348, 350
See application file for complete search history.

(56) References Cited

U.S. PATENT DOCUMENTS

| | | | |
|---|---|---|---|
| 52,231 | A | 1/1866 | Walton |
| 59,839 | A | 11/1866 | Hoard |
| 123,917 | A | 2/1872 | Ladd |
| 133,973 | A | 12/1872 | Everett |
| 170,158 | A | 11/1875 | Cushing |
| 170,995 | A | 12/1875 | Daniels |
| 197,902 | A | 12/1877 | Scott |
| 239,855 | A | 4/1881 | Schneider |
| 252,590 | A | 1/1882 | Loper |
| 275,293 | A | 4/1883 | Tisdale |
| 276,602 | A | 5/1883 | Kirk |
| 323,058 | A | 7/1885 | Mitchell |

(Continued)

FOREIGN PATENT DOCUMENTS

| | | |
|---|---|---|
| DE | 314258 | 9/1918 |
| EP | 1245663 | 10/2002 |

(Continued)

OTHER PUBLICATIONS www.wood-database.com (Year: 1996).*

(Continued)

*Primary Examiner* — Ellen M McAvoy
*Assistant Examiner* — Chantel Graham
(74) *Attorney, Agent, or Firm* — Element IP, PLC

(57) ABSTRACT

A wooden wick comprising a strip of wood. Such wick further includes a wood booster member connected to the strip of wood. At least the strip of wood or the booster member comprises a grain, wherein the grain is figured.

13 Claims, 4 Drawing Sheets

(56) References Cited

U.S. PATENT DOCUMENTS

| | | | |
|---|---|---|---|
| 383,822 | A | 5/1888 | Munger |
| 415,231 | A | 11/1889 | Walters |
| 431,033 | A | 7/1890 | Chapin |
| 436,509 | A | 9/1890 | Walters |
| 486,966 | A | 11/1892 | Elsinger |
| 731,033 | A | 6/1903 | Freeman |
| 747,282 | A | 12/1903 | Wallgren |
| 827,066 | A | 7/1906 | Hafner |
| 1,267,968 | A | 5/1918 | Bulle |
| 1,320,109 | A | 10/1919 | Wooster |
| 1,389,490 | A | 8/1921 | Cook et al. |
| 1,475,134 | A | 11/1923 | Oakes |
| 1,576,205 | A | 3/1926 | Mertens |
| 1,636,709 | A | 7/1927 | Schmidt |
| 1,657,391 | A | 1/1928 | Haney |
| 1,660,760 | A | 2/1928 | Murphy |
| 1,756,885 | A | 4/1930 | Schafer |
| 1,831,902 | A | 11/1931 | Brown |
| 1,841,690 | A | 1/1932 | Weindel, Jr. |
| 1,961,920 | A | 6/1934 | Arpin |
| 2,015,383 | A | 9/1935 | Konig et al. |
| 2,107,054 | A | 2/1938 | Haymond |
| D111,775 | S | 10/1938 | Seaver |
| 2,168,698 | A | 8/1939 | Bunt et al. |
| 2,241,167 | A | 5/1941 | Storck |
| 2,324,753 | A | 7/1943 | Alexiade |
| 2,354,343 | A | 7/1944 | Webber et al. |
| 2,373,512 | A | 4/1945 | Starner |
| 2,376,083 | A | 5/1945 | Quinn |
| 2,464,361 | A | 3/1949 | Wilson |
| 2,570,841 | A | 10/1951 | O'Connor |
| 2,611,254 | A | 9/1952 | Byrnes |
| D178,200 | S | 7/1956 | McKenzie et al. |
| 2,758,460 | A | 8/1956 | Ciano |
| 2,809,512 | A | 10/1957 | Hartnett |
| 2,811,428 | A | 10/1957 | Smith |
| 2,959,950 | A | 11/1960 | Weglin |
| 3,039,283 | A | 6/1962 | Buscemi |
| 3,086,658 | A | 4/1963 | Palmer |
| 3,175,876 | A | 3/1965 | Fredericks |
| 3,269,807 | A | 8/1966 | Key, Jr. |
| 3,286,492 | A | 11/1966 | Frazier, Jr. |
| 3,367,758 | A | 2/1968 | Ambrose et al. |
| 3,380,797 | A | 4/1968 | Summers |
| 3,428,409 | A | 2/1969 | Summers |
| 3,462,235 | A | 8/1969 | Summers |
| 3,466,135 | A | 9/1969 | Summers |
| 3,495,924 | A | 2/1970 | Seni et al. |
| 3,560,122 | A | 2/1971 | Cassar |
| 3,582,251 | A | 6/1971 | Concannan |
| 3,637,335 | A | 1/1972 | Uhl |
| 3,652,197 | A | 3/1972 | Tokarz |
| 3,706,523 | A | 12/1972 | Kumm |
| 3,759,478 | A | 9/1973 | Schmitt et al. |
| 3,761,702 | A | 9/1973 | Andeweg |
| 3,883,143 | A | 5/1975 | Kelley et al. |
| 3,998,922 | A | 12/1976 | Weiss |
| 4,304,547 | A | 12/1981 | Buzil |
| 4,380,200 | A | 4/1983 | Reninger |
| 4,381,914 | A | 5/1983 | Ferguson |
| 4,386,904 | A | 6/1983 | Miyahara et al. |
| 4,449,987 | A | 5/1984 | Lindauer |
| 4,477,249 | A | 10/1984 | Ruzek et al. |
| 4,557,687 | A | 12/1985 | Schirneker |
| 4,568,269 | A | 2/1986 | Lin |
| 4,568,270 | A | 2/1986 | Marcus et al. |
| 4,682,947 | A | 7/1987 | Luken, Jr. |
| 4,696,640 | A | 9/1987 | Pitchford |
| 4,725,286 | A | 2/1988 | Brame |
| 4,804,323 | A | 2/1989 | Kim |
| D301,749 | S | 6/1989 | Comstock |
| 4,839,144 | A | 6/1989 | Martin |
| 4,855,098 | A | 8/1989 | Taylor |
| 4,917,597 | A | 4/1990 | Henze |
| 5,015,175 | A | 5/1991 | Lee |
| 5,069,617 | A | 12/1991 | Lin |
| D350,566 | S | 9/1994 | Pearson |
| 5,354,197 | A | 10/1994 | Barone |
| 5,363,590 | A | 11/1994 | Lee |
| 5,487,658 | A | 1/1996 | Lee |
| 5,597,300 | A | 1/1997 | Wohl et al. |
| 5,683,239 | A | 11/1997 | Cardosi |
| 5,683,762 | A | 11/1997 | Banschick |
| 5,690,484 | A | 11/1997 | Leonard et al. |
| 5,762,487 | A | 6/1998 | Kujawski |
| 5,772,424 | A | 6/1998 | Nokelainen |
| D397,459 | S | 8/1998 | Hsu |
| 5,807,096 | A | 9/1998 | Shin et al. |
| 5,830,245 | A | 11/1998 | Raddon |
| 5,842,850 | A | 12/1998 | Pappas |
| 5,846,070 | A | 12/1998 | Kim et al. |
| 5,879,153 | A | 3/1999 | Slejertin |
| 5,967,769 | A | 10/1999 | Thompson |
| 6,017,373 | A | 1/2000 | Frisch |
| 6,033,210 | A | 3/2000 | Freeman |
| 6,063,144 | A | 5/2000 | Calzada et al. |
| 6,068,472 | A | 5/2000 | Freeman et al. |
| 6,074,199 | A | 6/2000 | Song |
| 6,076,515 | A | 6/2000 | Smith |
| 6,129,771 | A | 10/2000 | Ficke |
| 6,214,295 | B1 | 4/2001 | Freeman |
| 6,214,512 | B1 | 6/2001 | Freeman et al. |
| 6,276,925 | B1 | 8/2001 | Varga |
| D456,537 | S | 4/2002 | Leeds |
| D458,394 | S | 6/2002 | Leeds |
| D459,498 | S | 6/2002 | Araujo |
| 6,405,441 | B1 | 6/2002 | Rucker |
| 6,409,501 | B1 | 6/2002 | Pappas |
| 6,419,713 | B1 | 7/2002 | Durand et al. |
| 6,440,184 | B2 | 8/2002 | Noda et al. |
| 6,444,156 | B1 | 9/2002 | Schwarz et al. |
| 6,454,561 | B1 | 9/2002 | Colthar et al. |
| 6,471,899 | B2 | 10/2002 | Daiber et al. |
| D466,632 | S | 12/2002 | Lablaine |
| 6,508,644 | B1 | 1/2003 | Pesu et al. |
| 6,554,448 | B2 | 4/2003 | Carpenter |
| 6,568,934 | B1 | 5/2003 | Butler |
| D481,142 | S | 10/2003 | Leeds |
| 6,783,356 | B2 | 8/2004 | Hermanson |
| D496,474 | S | 9/2004 | Murdick |
| 6,793,697 | B2 | 9/2004 | Sprules et al. |
| 6,823,780 | B2 | 11/2004 | Vogt et al. |
| 6,921,260 | B2 | 7/2005 | Garnys |
| 6,991,453 | B2 | 1/2006 | Decker et al. |
| D590,078 | S | 4/2009 | Horenziak et al. |
| 7,524,339 | B2 | 4/2009 | Decker et al. |
| 7,568,913 | B2 | 8/2009 | Decker et al. |
| 7,850,444 | B2 | 12/2010 | Kubicek et al. |
| D637,741 | S | 5/2011 | Horenziak et al. |
| D643,554 | S | 8/2011 | Decker |
| D644,359 | S | 8/2011 | Decker |
| D644,360 | S | 8/2011 | Decker |
| D658,316 | S | 4/2012 | Van Dijk |
| D663,450 | S | 7/2012 | Delcotto et al. |
| D669,615 | S | 10/2012 | Delcotto et al. |
| 8,348,662 | B2 | 1/2013 | Decker |
| D678,558 | S | 3/2013 | Decker |
| 8,708,694 | B2 | 4/2014 | Delcotto et al. |
| D705,459 | S | 5/2014 | Decker |
| D708,777 | S | 7/2014 | Delcotto et al. |
| D715,989 | S | 10/2014 | Delcotto et al. |
| 8,961,171 | B2 | 2/2015 | Decker |
| 9,039,409 | B2 | 5/2015 | Decker |
| 9,120,995 | B2 | 9/2015 | Delcotto et al. |
| D740,461 | S | 10/2015 | Decker |
| 9,261,275 | B2 | 2/2016 | Decker |
| 9,410,696 | B2 | 8/2016 | Decker |
| 2001/0029003 | A1 | 10/2001 | Zou |
| 2001/0043469 | A1 | 11/2001 | Carpenter et al. |
| 2002/0001344 | A1 | 1/2002 | Jones et al. |
| 2002/0018976 | A1 | 2/2002 | Zou |
| 2002/0022205 | A1 | 2/2002 | Elliott et al. |
| 2003/0036028 | A1 | 2/2003 | Pesu et al. |
| 2003/0162142 | A1 | 8/2003 | Bennetts et al. |

(56) References Cited

U.S. PATENT DOCUMENTS

| | | | | |
|---|---|---|---|---|
| 2004/0008509 | A1 | 1/2004 | Decker et al. | |
| 2004/0009447 | A1 | 1/2004 | Decker | |
| 2004/0029061 | A1 | 2/2004 | Dibnah et al. | |
| 2004/0033463 | A1 | 2/2004 | Pesu et al. | |
| 2005/0037307 | A1 | 2/2005 | Decker et al. | |
| 2005/0037308 | A1 | 2/2005 | Decker | |
| 2005/0115145 | A1 | 6/2005 | Decker et al. | |
| 2008/0153046 | A1 | 6/2008 | Delcotto | |
| 2011/0024945 | A1 * | 2/2011 | Decker | F23D 3/16 264/279 |
| 2011/0027735 | A1 | 2/2011 | Decker | |
| 2011/0027736 | A1 | 2/2011 | Decker | |
| 2011/0027737 | A1 | 2/2011 | Decker | |
| 2011/0225392 | A1 | 9/2011 | Barry | |
| 2012/0064467 | A1 | 3/2012 | Delcotto | |
| 2012/0129114 | A1 | 5/2012 | Barresi | |
| 2012/0148966 | A1 | 6/2012 | Ramaker et al. | |
| 2012/0202160 | A1 | 8/2012 | Ford | |
| 2012/0264069 | A1 | 10/2012 | Ramirez | |
| 2013/0095440 | A1 | 4/2013 | Cagle et al. | |
| 2013/0112346 | A1 | 5/2013 | Cagle et al. | |
| 2015/0322379 | A1 | 11/2015 | Delcotto et al. | |
| 2020/0208079 | A1 * | 7/2020 | Delcotto | F23D 3/40 |

FOREIGN PATENT DOCUMENTS

| | | |
|---|---|---|
| FR | 2 639 356 | 5/1990 |
| FR | 2 725 372 | 4/1996 |
| FR | 2 726 573 | 5/1996 |
| FR | 2 811 676 | 1/2002 |
| GB | 16702 | 3/1915 |
| GB | 191516702 | 3/1916 |
| GB | 118741 | 11/1917 |
| GB | 1 238 214 | 9/1968 |
| GB | 1 558 713 | 3/1977 |
| JP | 2932371 | 5/1999 |
| SE | 9903818 | 5/2000 |

OTHER PUBLICATIONS

Wood Handbook, Wood as an Engineering Material, Centennial Edition, USDA (Apr. 2010).

Global Design Database, Registration No. 49900086-0001 (Apr. 11, 2019).

Global Design Database, Registration No. 40100590-0029 (Apr. 11, 2019).

European Office Action Issued Aug. 30, 2017, In European Patent Application No. 12 191 762.9.

Firewood for Your Fireplace; Warren Donnelly: Oct. 1974; pp. 18,25,34,35,37,84,85,88-95.

www.CLARLUSSP.com/candles/index.php, "Waxes: Candles," Internet printout on Jul. 6, 2006, 1 page.

Www.wetestit.com/wax.htm, "WAX." Internet printout on Jul. 6, 2006, 3 pages.

Improvements Catalog, [Online], [Retrieved on Jan. 11, 2005], Retrieved from the internet: http://www.improvementscatalog.com/Parent.asp?product=240717x&dept%5Fid=300&subdept%5Fid=304>.

World Flame Catalog, [Online], [Retrieved on Jan. 11, 2005], Retrieved from the Internet: http://www.golighttheworld.com/Store/ProductJCategoryInfo.aspx?cid=7>.

World Flame Catalog, [Online], [Retrieved on Jan. 11, 2005], Retrieved from the Internet: http://www.golighttheworld.com/Store/Product/CategoryInfo.aspx?cid=17>.

Norma Coney, 2000, Lark Books, Deborah Morgenthal, pp. 16, 49-50, & 55-58.

Request for Ex Parte Reexamination of U.S. Pat. No. 8,961,171, dated Apr. 29, 2016.

Request for Ex Parte Reexamination of U.S. Pat. No. 8,961,171; Replacement Detailed Request dated Jun. 10, 2016.

Internet Article, "Wood Candle Wicks—Crackling Wooden Wicks," http://www.woodcandlewick.com, p. 1-6 (Sep. 28, 2015).

Nussle, W., "Candle Crafting from an Art to a Science," A.S. Barnes and Co., Inc. (1971) pp. 16-17.

Olden, D., "Candles that Earn", Peanut Butter Publishing, (1990), Chapter 8, pp. 153-160.

Olden, D., "Candles that Earn", Peanut Butter Publishing, (1990), Chapter 7, pp. 133-153.

Robbins, F.W., The Story of the Lamp (And the Candle), (Reprint 1970), Kingsmead Reprints, Bath, pp. 16-23.

* cited by examiner

CANDLE HAVING A WOODEN WICK WITH FIGURED GRAIN

CROSS REFERENCE TO RELATED APPLICATIONS

This application is a continuation of U.S. patent application Ser. No. 15/728,599, filed on Oct. 10, 2017, which is a continuation of U.S. patent application Ser. No. 15/074,301, filed on Mar. 18, 2016, the disclosures of which are incorporated herein by reference in their entireties. This application claims priority to U.S. Provisional Patent Application No. 62/138,521, filed on Mar. 26, 2015, the disclosure of which is incorporated herein by reference in its entirety.

BACKGROUND OF THE INVENTION

Field of the Invention

The present invention relates, in general, to wicks for candles and, more particularly, this invention relates to a wooden wick with figured grain.

Description of Related Art

Prior to the conception and development of the present invention, as is generally well-known in the prior art, candles and wicks which are lit to provide a flame and which melts the wax surrounding such wicks have been in existence and commercially available for many years. These prior art type wicks have normally been produced from a cloth fiber and are embedded into an appropriate portion of the wax, generally in the center, forming the candle. Wicks formed from pieces of wood have also been used; however, these wooden wicks have been formed as a single piece of wood which has a number of distinct disadvantages, including that they do not burn well. Wicks with straight grain allow the candle to burn at a very high temperature. When the candle is burning at such a high temperature, a person can be burned by touching the container or soot becomes a problem.

Thus, these prior art type wooden wicks are dangerous and not attractive.

SUMMARY OF THE INVENTION

The present invention provides, in a first aspect, a wooden wick for use in a wax candle. This wooden wick includes a strip of a predetermined wood having each of a first predetermined length, a first predetermined width and a first predetermined thickness. Such wick further includes a booster member having each of a second predetermined length, a second predetermined width and a second predetermined thickness and a means for adhering the booster member to such strip of wood. The booster member can be constructed from wood to form a strip of wood. Either the strip of wood or the booster have a grain that is figured.

In a second aspect, the present invention provides a method of manufacturing a wooden wick for use in a wax candle. The method includes the steps of selecting a type of wood to be formed into a strip of wood to be used in the wooden wick. Thereafter, cutting such wood selected into a strip having each of a first predetermined length, a first predetermined width and a first predetermined thickness.

The method includes the steps of selecting a type of wood to be formed into a strip of wood to be used in a booster member, then cutting such wood selected into such strip having each of a first predetermined length, a first predetermined width and a first predetermined thickness and adhering such booster member to the strip of wood forming the wick. Either the strip of wood or the booster have a grain that is figured.

Preferably, the wicks and booster are constructed of all natural components. The booster is a very important part of the wick, which enables the wick to burn in natural candle wax. A single piece of wood will not burn well in natural wax. Also an untreated wood will not burn consistently through a natural wax. Natural waxes should be considered as any waxes derived from animal or plant sources. Preferably a vegetable wax, such as soy wax, jojoba wax, bayberry wax, candelilla wax, carnauba wax, castor wax or a combination thereof, is used.

An important benefit to having a figured grain is that his allows for optimizing the wick's burning properties. Unexpectedly, wicks with figured grains burn better than those with generally straight grains. The wood can be any combination of species depending on the heat output that is desired. Cherry, oak, birch, maple, balsa, and rosewood species are examples of woods that could be used in constructing the wick.

The present invention provides, in a second aspect, a method of manufacturing a wooden wick. The method includes selecting a type of wood to be formed into a strip of wood to be used in such wooden wick, then cutting the wood selected into such strip having each of a first predetermined length, a first predetermined width and a first predetermined thickness. The wood comprises a grain that is figured.

Additionally, the method includes forming a booster member having each of a second predetermined length, a second predetermined width and a second predetermined thickness and then adhering such booster member to such strip of wood. Preferably, an adhesive is selected for adhering the booster member to such strip of wood.

In the preferred embodiment, such method further includes an additional step of ensuring that the strip of wood is clean before such strip of wood is adhered to the booster member, and further that such strip of wood is treated with a liquid wax and that the wooden wick is cured, preferably by baking, prior to use in such candle. It is further preferred that the booster member be soaked in an oil prior to adhering it to said strip of wood. Thereafter, said booster member is coated with a wax type material.

Additionally, the method includes an additional step of drying the wooden wick for a predetermined time, generally for about 8-48 hours, prior to use in such candle.

The wooden wick further includes a coloring agent to stain the wooden strip for enhancing a visual appearance thereof. Preferably, such coloring agent is a vegetable type coloring agent.

In one embodiment, the invention is a candle comprising a wooden wick and a meltable fuel. The wooden wick comprises a strip of a wood. A wooden booster member is joined to or adhered to the strip of wood. The candle further comprises a meltable fuel that is in direct contact with said wooden wick. The strip or the booster member comprise a grain, wherein the grain is figured.

In another embodiment, the invention is a method of manufacturing a candle. The method comprises placing a wooden wick into a container. The container is filled with a meltable fuel. The wooden wick comprises a strip of a wood having a first predetermined width; and a wooden booster member joined to or adhered to the strip of wood having a second predetermined width. The first predetermined width is greater than said second predetermined width. The strip or the booster member comprise a grain that is figured.

In another embodiment, the invention is a wooden wick. The wooden wick comprises a strip of wood and a wooden booster member joined to or adhered to the strip of wood. Either the strip of wood and/or the booster member comprise a grain that is figured.

In another embodiment, the invention is a method of manufacturing a wooden wick. The method comprises selecting a strip of wood and selecting a wooden booster member wherein the strip of wood and/or the booster member comprise a grain that is figured. The method further comprises joining or adhering the booster member to the strip of wood.

OBJECTS OF THE INVENTION

It is, therefore, one of the primary objects of the present invention to provide an improved wooden wick for use in a wax candle.

Another object of the present invention is to provide a method of producing such wooden wick.

Still, another object of the present invention is to provide a wooden wick for use in a wax candle which is relatively inexpensive to produce.

Yet another object of the present invention is to provide a wooden wick for a wax candle which has enhanced visual appeal.

An additional object of the present invention is to provide a method of producing a wooden wick for a wax candle which will exhibit enhanced burn qualities.

In addition to the various objects and advantages of the present invention described with some degree of specificity above, it should be obvious that additional objects and advantages of the present invention will become more readily apparent to those persons who are skilled in the relevant art from the following more detailed description of the invention, particularly, when such description is taken in conjunction with the attached drawing figures and with the appended claims.

BRIEF DESCRIPTION OF THE INVENTION

Figure 1:
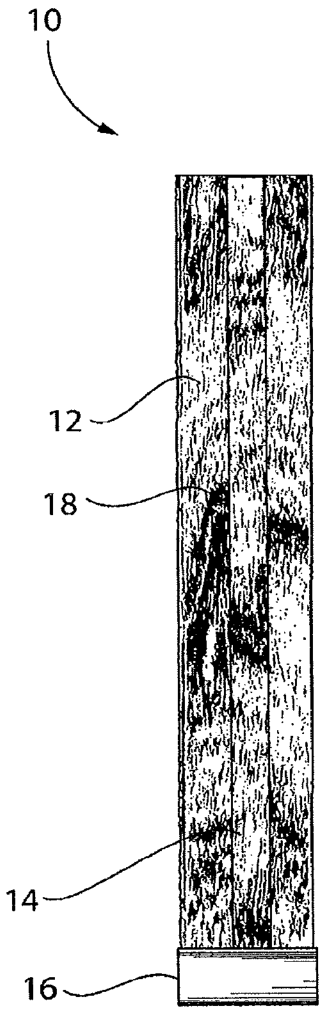
FIG. 1 is a plan view of a wooden wick according to an embodiment of the invention.

Prior to proceeding to the more detailed description of the present invention it should be noted that, for the sake of clarity and understanding, identical components which have identical functions have been identified with identical reference numerals throughout the several views illustrated in the drawing figures.

The object of the invention is to provide a wood wick with a figured grain.

In one embodiment, the invention is a wooden wick comprising a strip of wood and a wooden booster member. Either the wooden wick and/or the wooden booster member comprise a grain that is figured.

In one embodiment of the invention, the strip of wood has a first predetermined length that will generally be between about 4.375 and about 5.125 inches, up to 10 inches, up to 8 inches or up to 6 inches. In this embodiment, the booster member comprises a second predetermined length that will generally be between about 4.375 and about 5.125 inches, up to 10 inches, up to 8 inches or up to 6 inches. The strip of wood and booster member may be wood or wood-like boards. The board may be cut to a predetermined width at any time within the method to form the wood wick.

In one embodiment, the strip of wood has a first predetermined width, and the wooden booster has a second predetermined width. In one embodiment, the first predetermined width may be greater than the second predetermined width. In another embodiment, the first predetermined width and the second predetermined width are approximately the same. The first predetermined width and/or the second predetermined width may be between about 0.7 inch and about 0.8 inch, up to 1 inch, greater than 0.06 inches or between 0.6 inches and 1 inch.

Figured grain is due to the grain of the wood and to the way that the wood is cut. Straight grain is grain that runs along the longitudinal surface of the wood. Figured grain is grain that is not straight. Types of figured grain include burl, cluster burl, burr, pippy, birdseye, curly, tiger stripe, ropey/flame, quilted, pomelle, beeswing, bear claw, waterfall, crotch, spalting and fiddleback.

In one embodiment, the strip of wood or the booster member is infused with oil. This is done by soaking the strip of wood or the booster member in oil. The oil may be applied by spraying the oil onto the strip of wood or the booster member. While any oil may be used, in one embodiment, the oil is a vegetable oil. In another embodiment, the oil is soy oil. The oil aids in a consistent burn of the wick.

In another embodiment, the strip of wood or booster member is infused with a solution. The strip of wood or booster member may be soaked in the solution. The solution may be sprayed onto the strip of wood or booster member. The solution may comprise salt water, vinegar, or a combination of salt water and vinegar.

The salt water has a water to salt ratio (in terms of pounds) of 10 to 60 lbs of water to 1 lb of salt; 20 to 50 lbs of water to 1 lb of salt; 25 to 45 lbs of water to 1 lb of salt; 28 to 40 lbs of water to 1 lb of salt; 30 to 35 lbs of water to 1 lb of salt; 32 to 34 lbs of water to 1 lb of salt; or 33 to 34 lbs of water to 1 lb of salt. The salt may be any salt, including any edible salt. For example, the salt may be Anglesey sea salt, alacea salt, black lava salt, brine, butter salt, celery salt, curing salt, dairy salt, flake salt, fleur de sel, garlic salt, halite, Himalayan salt, jukyeorn, Kala namak, kosher salt, LoSalt, pickling salt, sal de tavira, sale marino di Trapani, sea salt, sel gris, sel de guérande, smoked salt, or truffle salt. Alternatively, the salt may comprise calcium chloride, calcium nitrate, lithium chloride, lithium nitrate, potassium chloride, potassium nitrate, magnesium chloride, magnesium nitrate, sodium chloride or sodium nitrate.

The vinegar may be 5 to 20 percent acetic acid; 7 to 15 percent acetic acid; 8 to 12 percent acetic acid or 10 percent acetic acid. In the embodiment wherein the planar body is infused with a combination of salt water and vinegar, the solution comprises the following ratio of salt water to vinegar 1 to 10 gallons of salt water to 1 gallon of vinegar; 2.5 to 7.5 gallons of salt water to 1 gallon of vinegar; 4 to 6 gallons of salt water to 1 gallon of vinegar; 4.5 to 5.5 gallons of salt water to 1 gallon of vinegar; or 5 gallons of salt water to one gallon of vinegar.

In one embodiment, the invention is a wooden wick comprising a strip of wood and a booster member wherein the booster member is joined to or adhered to the strip of wood. This may be done by using an adhesive, a fastener, a clip, a band, a rivet, an epoxy, a cement, or the like. In one preferred embodiment, an adhesive is used to adhere the strip to the booster member. The adhesive may be any adhesive useful in adhering materials to wood or wood-like material. The adhesive may be a natural adhesive, such as a vegetable based adhesive. The adhesive is preferably applied in an S pattern.

The wooden wick described above may further comprise a sustainer. A sustainer provides support to a wick that is in a candle. The wick can be inserted into the sustainer. The sustainer holding the wick may be positioned in the bottom of a container. The sustainer may be secured in place with an adhesive to hold the sustainer and wick in place at the bottom of the container. The sustainer may be self-extinguishing or heat resistant before the wick and sustainer or placed into the container that would hold the meltable fuel. Alternatively, the sustainer may be non-heat resistant or not be self-extinguishing. Examples of sustainers previously used can be found in U.S. Pat. Nos. 1,226,850; 1,267,968; 1,309,545; 1,320,109; 1,344,446; 1,505,092; 2,291,067; 2,324,753; 3,462,235; 3,998,922; and 4,381,914.

In one embodiment, the invention is a wooden wick comprising a strip of wood, a first booster member and a second booster member. The first booster member is joined to or adhered to the strip of wood. The second booster member is joined to or adhered to the strip of wood. In this embodiment, at least the strip of wood, the first booster member, or the second booster member comprises the grain described above.

In one embodiment, the invention is a candle comprising the wooden wick described above.

In another embodiment, the invention is a method of manufacturing a wooden wick. The method comprises providing a strip of wood. A booster member is adhered to the strip of wood. Optionally, a second booster member is adhered to the strip of wood. In this embodiment, at least the strip of wood, the first booster member, or the optional second booster member comprises the grain described above.

In further embodiment of the method of manufacturing the wooden wick, the method further comprises cutting the strip of wood, the booster member or the optional second booster member to a predetermined length, a predetermined width and a predetermined length. The width may vary between the strip of wood and booster member and/or second booster member. Thus, the first booster member may have a width that is similar to or smaller than the width for the strip of wood. Similarly, the second booster member may have a width that is similar to or smaller than the width of the strip of wood. The first and second booster member do not need to have the same width. In a preferred embodiment, the first and second booster member have similar widths.

The method of manufacturing the wooden wick may further comprise pressing the wood wick. The wood wick is pressed for a period of time in a wood press. The period of time may be at least 1 hour, at least 2 hours, at least 4 hours or at least 8 hours. The heating step may occur before or after the strip of wood and first booster and optional second booster member are joined to or adhered to one another.

The method may further comprise heating the wood wick after the strip of wood and first booster and optional second booster member are joined to or adhered to one another. The heating step may comprise baking the wood wick. The baking step may comprise placing the wood wick in an oven set to a temperature between 100° F. and 250° F., between 125° F. and 200° F., or between 130° F. and 180° F. The heating step may occur over about 1-12 hours, about 2-10 hours, 4-8 hours or about 8 hours.

In a further embodiment of the method of manufacturing the wooden wick, the wooden wick is treated with the solution described above. This treatment step may occur after the pressing step described above, or before the strip of wood and booster member(s) are joined to or adhered together. In one embodiment, the strip of wood and the booster member are treated separately before they are adhered to or joined together. The solution may be sprayed onto the wood wick, or the wood wick may be soaked in the solution. Alternatively, the wood wick may be treated before the pressing step described above. In the event that the wood wick is treated before the pressing step, the adhesive should be cured before proceeding to the treating step. Alternatively, the wood wick may be treated before the shavings or adhesive are applied, or after the shavings and adhesive are applied.

The method may further comprise treating the wooden wick with the oil described above. The oil may be sprayed onto the wooden wick, or the wooden wick may be soaked in the oil. The wooden wick may be treated with the oil after the wooden wick is treated with the solution, or before the wooden wick is treated with the solution. The oil may be applied onto the wooden wick before the wood wick is pressed, or after the wood wick is pressed. In one embodiment, the strip of wood and the booster member are treated separately before they are adhered to or joined together.

The method may further comprise treating the wooden wick with a vacuum. To do so, the wooden wick is placed into a bag, and the bag is connected to a hose that is connected to a vacuum. This step may be done after the wooden wick is treated with the oil, or before the wood wick is treated with the oil. The step may be done after the wooden wick is treated with the solution, or before the wooden wick is treated with the solution. This step may be done after the wooden wick is pressed or before the wood wick is pressed. In one embodiment, the strip of wood and the booster member are treated separately before they are adhered to or joined together.

In another embodiment of the method of manufacturing a wood wick, comprising providing a board that is wood or wood-like material. The board may comprise a first board, a second board and an optional third board, wherein the second board and optional third board are adhered to or joined to the first board. At least one of the boards comprises a grain that is figured. The board may be treated with the oil. The board may be treated with the solution. The board may be treated with the vacuum. The board may be heated. In this particular embodiment, the method may further comprise cutting the board to form wood wicks have a predetermined length, predetermined width and predetermined thickness.

The wooden wick has a moisture content. Since wicks can absorb moisture after processing, the moisture content for the purposes of this discussion means the moisture content at the final stage of processing. The final stage of processing can be after the last one of these steps is completed: a after the treating with the solution step; after the treating with the oil step; or after the treating with the vacuum step. The moisture content may be less than 10 percent, less than 8 percent, less than 6 percent, less than 4 percent, less than 3 percent or less than 2 percent.

Another embodiment of the invention is a method of manufacturing a candle. The candle comprises the wooden wick described above, and a meltable fuel. For example, the wicks of the present invention may be placed in a container. The container may be filled with the meltable fuel. The meltable fuel may be a vegetable wax, such as soy wax, jojoba wax, bayberry wax, candelilla wax, carnauba wax, castor wax or a combination thereof. Alternatively, the wooden wick may comprise a sustainer, described above, and the sustainer is first secured to the bottom of the container, and then the meltable fuel is poured into the container.

The wick of the present invention is made from all natural materials, and burns natural wax completely at a safe temperature. The planar body, the first planar booster, the second planar booster the adhesive, and/or the shavings are all natural materials. By using all natural materials, better performance is achieved.

Figure 2:
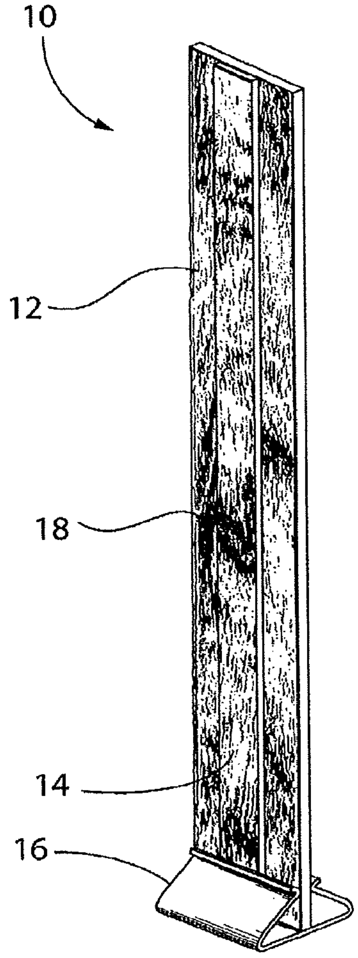
FIG. 2 is a perspective view of a wooden wick according to an embodiment of the invention.
Figure 3:
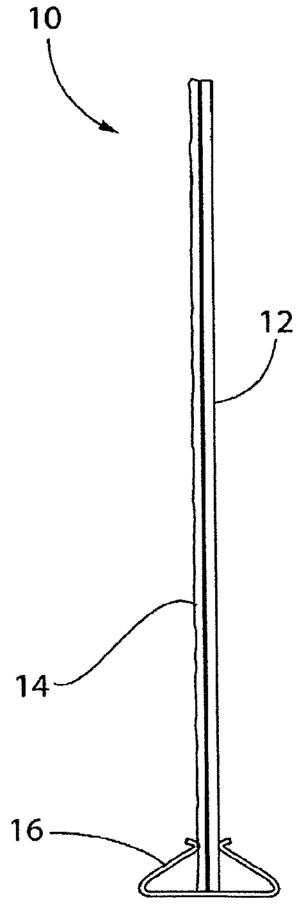
FIG. 3 is a profile view of a wooden wick according to an embodiment of the invention.

Reference is now made, more particularly, to FIGS. 1-3 which show an embodiment of the wick of the present invention. Illustrated therein is a wooden wick, generally designated 10, for use in a wax candle (not shown). The wooden wick 10 includes a strip of a predetermined wood 12 having each of a first predetermined length, a first predetermined width and a first predetermined thickness. Further, the wooden wick, according to the present invention, includes a booster member 14 having each of a second predetermined length, a second predetermined width and a second predetermined thickness. The strip 12 and/or the booster member 14 have a specific grain. The grain 18 is figured.)

One example of figured grain is curly grain. Curly grain is grain that is compressed perpendicularly crossing the face of the wood that produces alternate stripes of fiber. Curly grain may be present in many species of wood, including koa, maple, walnut, ash, oaks, and ebony.

Figure 4:
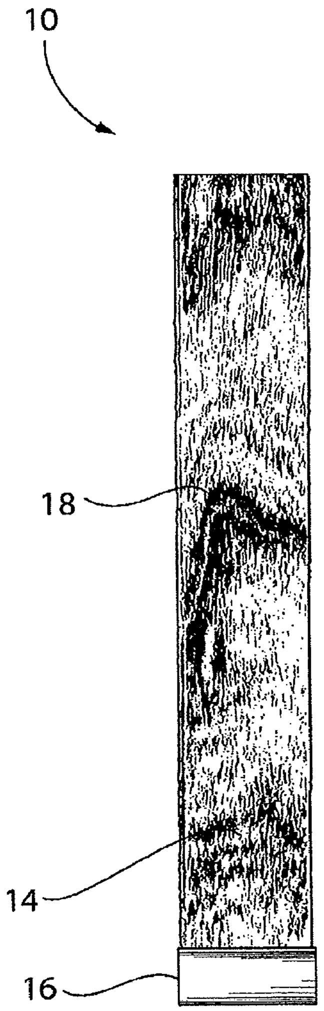
FIG. 4 is a plan view of a wooden wick according to another embodiment of the invention.
Figure 5:
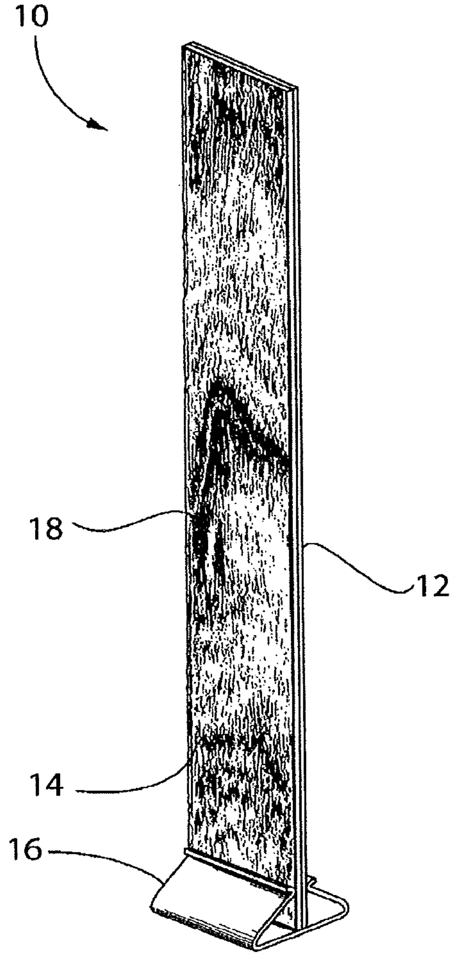
FIG. 5 is a perspective view of a wooden wick according to another embodiment of the invention.
Figure 6:
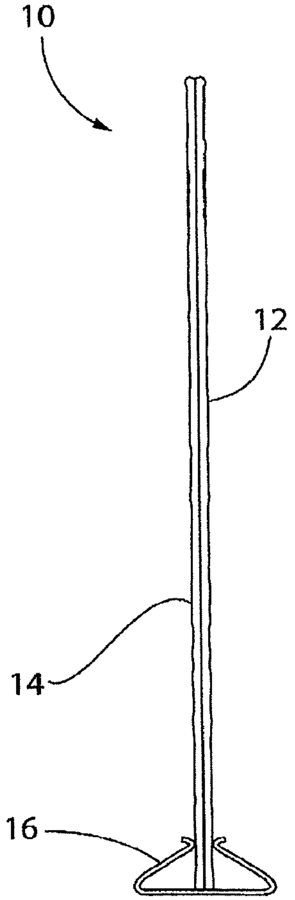
FIG. 6 is a profile view of a wooden wick according to another embodiment of the invention.

Reference is now made, more particularly, to FIGS. 4-6 which show an embodiment of the wick of the present invention. Illustrated therein is a wooden wick, generally designated 10, for use in a wax candle (not shown). The wooden wick 10 includes a strip of a predetermined wood 12 having each of a first predetermined length, a first predetermined width and a first predetermined thickness. Further, the wooden wick, according to the present invention, includes a booster member 14 having each of a second predetermined length, a second predetermined width and a second predetermined thickness. In one embodiment, the strip has a grain 18 wherein the grain is figured. In a preferred embodiment, the grain is curly. In another embodiment, the booster member 14 has a grain 18, wherein the grain 18 is figured, or preferably curly.

In one embodiment of the invention, the first predetermined length of such strip of wood 12 will generally be between about up to 8 inches. In this embodiment, the first predetermined width of the strip of wood 12 will generally be between about 0.06 inches and about 1 inch. In one embodiment of the invention, the second predetermined length of such booster member 14 will generally be between about 3.45 and about 3.55 inches, and the second predetermined width of the booster member 14 will generally be between about 0.06 inches and about 1 inch. Further, in this embodiment such first and second predetermined thickness will be substantially identical.

Figure 7:
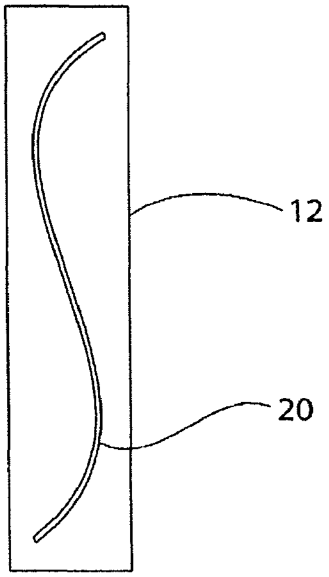
FIG. 7 is a plan view of a wooden wick according to another embodiment of the invention with adhesive applied in an S pattern.
Figure 8:
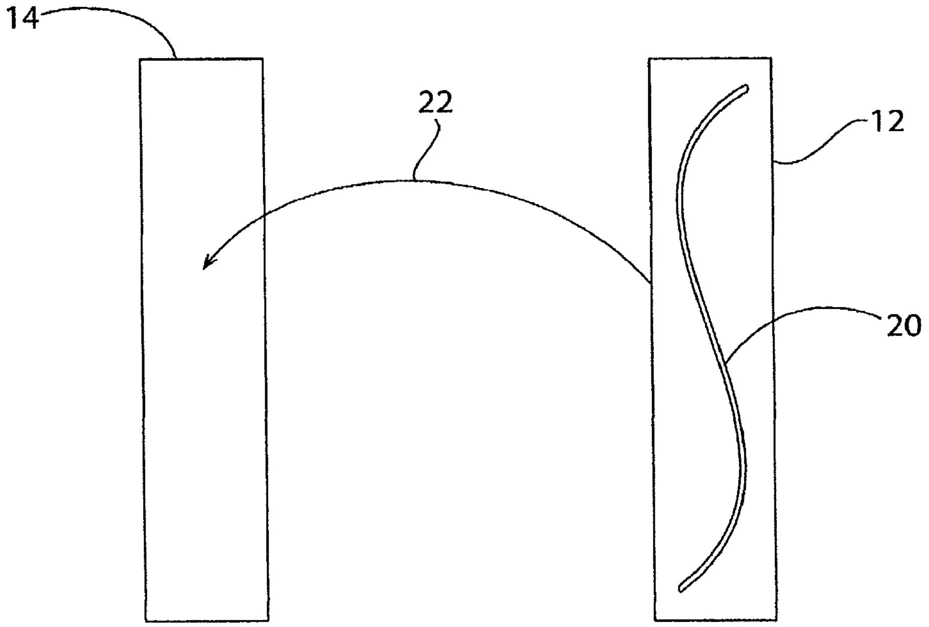
FIG. 8 is a plan view of a wooden wick according to another embodiment of the invention with adhesive applied in an S pattern and a booster member ready to receive the wooden wick.

Reference is now made, more particularly, to FIGS. 7 and 8 which show an embodiment of the wick of the present invention in the assembly process. The strip of wood 12 comprises a means for adhering the booster member 14 to such strip of wood 12. Such means is preferably an adhesive 20. Adhesive 20 is preferably applied in an S pattern as shown in FIGS. 7 and 8. The strip of wood 12 is then mated with booster member 14 as directed by directional arrow 22. This configuration has been shown to keep the strip of wood 12 and booster member 14 closely bound to each other while still allowing gases, steam and air to move between the strip of wood 12 and booster member 14. Other means for adhering the booster member to a strip of wood 12 could comprise at least one fastener, clip, band, rivet, epoxy, cement, or the like. In one embodiment, the strip of wood 12 has a grain 18, wherein the grain is figured, or preferably curly. In another embodiment, the booster member 14 has a grain 18, wherein the grain 18 is figured or preferably curly.

Figure 9:
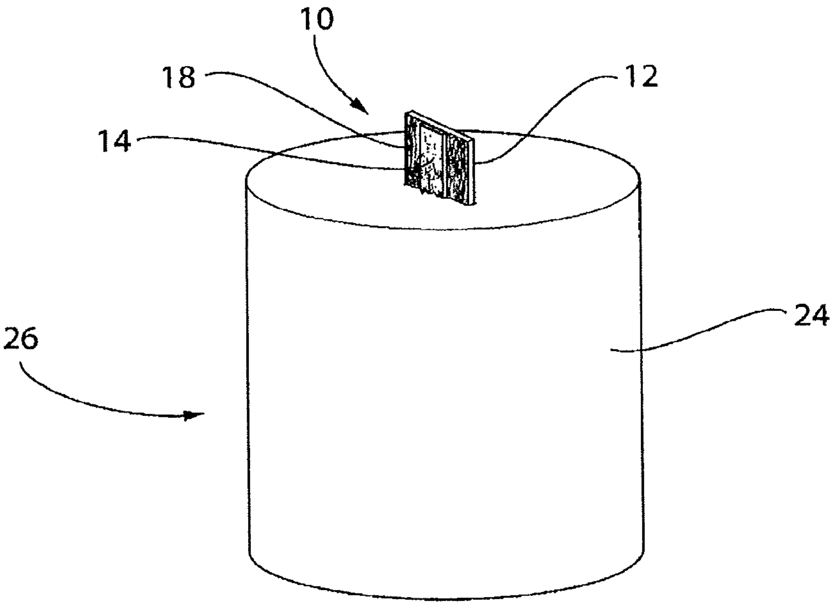
FIG. 9 is a perspective view of a candle comprising a wooden wick with a booster member.

Reference is now made to FIG. 9 which shows the wick 10 embedded in wax 24 to create candle 26.

Figure 10:
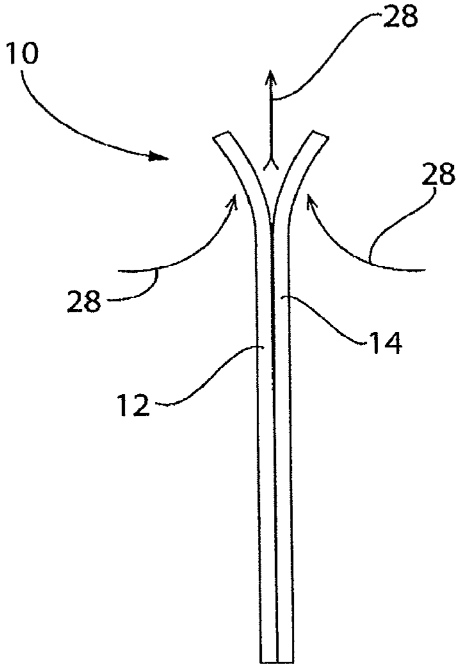
FIG. 10 is a close-up profile view of a portion of the wooden wick with a booster member showing airflow while burning the wick.

Reference is now made to FIG. 10 which shows the wick 10 with directional arrows 28 which indicate the general direction of air and gas movement while the wick 10 is burning. The chimney effect of the wick 10 has a significant effect on the efficient burning of the wick 10 and the candle 26 as a whole. The extent of the peeling away between the wood strip 12 and booster member 14 is exaggerated in this drawing for illustrative purposes.

While presently preferred and various alternative embodiments of the present invention have been described in sufficient detail above to enable a person skilled in the relevant art to make and use the same, it should be obvious that various other adaptations and modifications can be envisioned by those persons skilled in such art without departing from either the spirit of the invention or the scope of the appended claims.

The invention claimed is:

1. A wick, comprising:

a planar strip of wood having each of a first predetermined length, a first predetermined width, and a first predetermined thickness; and a secondary planar member having each of a second predetermined length, a second predetermined width, and a second predetermined thickness;

wherein:

at least one of the planar strip of wood and the secondary planar member comprises a wood having a figured grain; and the planar strip of wood is clipped to the secondary planar member.

2. The wick according to claim 1, wherein the planar strip of wood has a length of up to 8 inches.

3. The wick according to claim 1, wherein the planar strip of wood has a width of less than 1 inch.

4. The wick according to claim 1, wherein the figured grain is curly.

5. The wick according to claim 1, the planar strip of wood comprises at least one wood selected from the group consisting of koa, walnut, ash, and ebony.

6. The wick according to claim 1 wherein the planar strip of wood has a moisture content of less than 6 percent.

7. The wick according to claim 1, wherein the wick is obtained by a method comprising treating with a coloring agent.

8. The wick according to claim 7, wherein the coloring agent is a vegetable coloring agent.

9. A method of manufacturing a wick, the comprising:

cutting wood into a strip having each of a first predetermined length, a first predetermined width, and a first predetermined thickness;

forming a secondary planar member having each of a second predetermined length, a second predetermined width, and a second predetermined thickness; and clipping the secondary planar member to the strip of wood;

wherein at least one of the strip of wood and the secondary planar member comprises a wood having a figured grain.

10. The method according to claim 9, further comprising treating the planar strip of wood and the secondary planar member with an oil.

11. The method according to claim 9, further comprising heating the strip of wood and the secondary planar member.

12. The method according to claim 9, further comprising pressing the strip of wood and the secondary planar member.

13. The method according to claim 9, further comprising subjecting the strip of wood and the secondary planar member to a vacuum.

* * * * *